UNITED STATES PATENT OFFICE

2,077,967

MANUFACTURE OF ALCOHOLS FROM THEIR CORRESPONDING ALKYLENES

Joseph Stanley, Jackson Heights, N. Y., assignor to W. A. Cleary Corporation, a corporation of New Jersey No Drawing. Application May 1, 1935,
Serial No. 19,174

25 Claims. (Cl. 260—156)

The present invention relates to the manufacture of alcohols from their corresponding alkylenes or olefines. Particularly one of the objects of this invention is the conversion of ethylene into ethyl alcohol.

Olefines or alkylenes have been converted into their corresponding alcohols by causing them to react with a mineral acid like sulphuric or phosphoric acid to form the corresponding esters, diluting said esters with water, and boiling off the alcohol produced by the hydrolysis. The diluted mineral acid left behind after distilling off the alcohol, was reconcentrated, and reused for the absorption of more olefine. It is an object of this invention to do away with these long and expensive processes of dilution, distillation, and reconcentration by making use of certain chemical reactions of which I am the discoverer.

I have discovered that an alkyl sulphate, an alkyl phosphate, or an alkyl aryl sulphonate react with boric acid to form the corresponding alkyl borates. For example the ethyl sulphates, the ethyl phosphates, and ethyl phenyl sulphonate when mixed with boric acid, and heated to 110 to 140 degrees centigrade liberate ethyl borate, in accordance with the following chemical reactions represented by the following chemical equations:

$3SO_2(OC_2H_5)_2 + B(OH)_3 =$
$\quad\quad 3SO_2(OC_2H_5)(OH) + B(OC_2H_5)_3$
$3SO_2(OC_2H_5)(OH) + B(OH)_3 =$
$\quad\quad 3SO_2(OH)_2 + B(OC_2H_5)_3$
$3SO_2(OC_2H_5)_2 + 2B(OH)_3 =$
$\quad\quad 3SO_2(OH)_2 + 2B(OC_2H_5)_3$
$3PO(OC_2H_5)_3 + 2B(OH)_3 =$
$\quad\quad 3PO(OC_2H_5)(OH)_2 + 2B(OC_2H_5)_3$
$PO(OC_2H_5)_3 + B(OH)_3 = PO(OH)_3 + B(OC_2H_5)_3$
$3PO(OH)(OC_2H_5)_2 + 2B(OH)_3 =$
$\quad\quad 3PO(OH)_3 + 2B(OC_2H_5)_3$
$3PO(OH)_2(OC_2H_5) + B(OH)_3 =$
$\quad\quad 3PO(OH)_3 + B(OC_2H_5)_3$
$3SO_2(C_6H_5)(OC_2H_5) + B(OH)_3 =$
$\quad\quad 3SO_2(C_6H_5)(OH) + B(OC_2H_5)_3$ After the removal of the ethyl borate by distillation, the acid or acid ester remaining behind suffers no dilution, and can be used without any treatment for the absorption of more ethylene. The distilled ethyl borate is then mixed with the stoichiometric proportion of water to hydrolyze it into boric acid and ethyl alcohol, and the boric acid separated from the alcohol by filtration, freezing, or distillation, or a combination of these processes. I thus recover substantially all of the boric acid which I reuse for the same purpose.

After the reaction between the alkyl sulphate and boric acid has taken place, the reactor can be put under diminished pressure and thus cause the volatilization of the ethyl borate below its normal boiling point of 120 degrees centigrade. By distilling off the ethyl borate as soon as formed under diminished pressure I not only bring the reaction to better completion, but I further minimize any slight decomposition of the sulphuric acid by causing the ethyl borate to boil at a lower temperature.

I do not limit myself to the preparation of ethyl alcohol, but include the preparation of any alkyl alcohol from its corresponding olefine. In the preparation of the higher dialkyl sulphates, and trialkyl borates I find that low temperatures and high vacua are most essential, as otherwise decomposition of the dialkyl sulphate may take place during its transformation into its corresponding borate.

I find it to advantage sometimes to mix in with the boric acid a proportion of metaboric acid, pyroboric acid, or even boric oxide before I use it for the dealkylation of the mineral acid esters described above.

I find it to advantage for certain purposes to make the conversion of alkylene into its corresponding alcohol continuous. For example I can lead a proper and continuous stream of ethylene, and a proper and continuous stream of boric acid into a reactor containing sulphuric acid of the proper concentration at the proper temperature and pressure. This causes a volatilization of the ethyl borate with the excess ethylene which are driven out of the reactor into a condenser which causes the condensation of the ethyl borate, the ethylene is not condensed however but it is recycled into the reactor. The condensed ethyl borate is sent to the hydrolyzer where it is mixed with the stoichiometric proportion of water and hydrolyzed into boric acid and ethyl alcohol. The alcohol is distilled off and the residue of boric acid recycled into the reactor. The same sulphuric and boric acids can thus be used to transform an almost indefinite amount of ethylene into ethyl alcohol.

A novelty of this invention is that I can dealkylate alkyl sulphates and phosphates by means of boric acid using relatively low temperatures, and thus conserve the sulphuric acid or phosphoric acid from decomposition and/or volatilization. Another novelty of this invention is that I can dealkylate alkyl sulphates or phosphates without the necessity of diluting these esters with water. Another novelty of this invention is that I do not have to reconcentrate any dilute sulphuric or phosphoric acid, because said acids are never diluted with water to start with. Another novelty of this invention is that the alkyl borate is readily hydrolyzed with the stoichiometric proportion of water to produce a solution of boric acid in substantially anhydrous alcohol which can be readily separated from the boric acid in substantially anhydrous form, thus doing away with the necessity of expensive rectification of the dilute alcohol solutions which are obtained by other processes, not to mention doing away with the necessity of chemical or azeotropic dehydration of the rectified alcohol to make it substantially anhydrous. A further novelty of this invention is that I convert a difficultly hydrolyzable and volatile ester like ethyl sulphate into one which is more easily hydrolyzable and volatile like ethyl borate.

To illustrate the practice of the invention I shall give an example. Ethylene was passed into heated sulphuric acid in the well known way until the proper conversion into ethyl sulphates had taken place. A vacuum was then applied to the above liquid permitting the distillation and subsequent condensation of the diethyl sulphate. Two hundred grams of this diethyl sulphate were collected and added to 27 grams of boric acid. The mixture was heated at 120 to 130 degrees centigrade for a short time and then a slight vacuum was applied whereby the ethyl borate distilled off and was condensed, 61 grams of ethyl borate being collected. This ethyl borate was then mixed with 23 grams of water which produced 84 grams of a solution of boric acid in absolute alcohol. The absolute alcohol was distilled off and it measured 70 cubic centimeters. The boric acid residue weighed 24.5 grams. The above alcohol was next made alkaline with potassium hydroxide to fix any boric acid that may have distilled over with it, and redistilled.

I claim:

1. A process for producing alkyl borates comprising reacting an alkyl ester of an acid of the group consisting of sulphuric, phosphoric, and aryl sulphonic with boric acid, and separating the alkyl borate by distillation.

2. A process for producing alkyl borates comprising reacting an alkyl ester of sulphuric acid with boric acid, and separating the alkyl borate by distillation.

3. A process for producing alkyl borates comprising reacting an alkyl ester of phosphoric acid with boric acid, and separating the alkyl borate by distillation.

4. A process for producing alkyl borates comprising reacting an alkyl ester of an aryl sulphonic acid with boric acid, and separating the alkyl borate by distillation.

5. A process for producing ethyl alcohol comprising the conversion of ethylene to an ethyl ester of a strong non-oxidizing inorganic acid, deethylating said ester by means of boric acid thereby producing ethyl borate, distilling off the ethyl borate, and hydrolyzing said ethyl borate producing ethyl alcohol and regenerating the boric acid.

6. A process which comprises dealkylating an alkyl sulphate with boric acid producing an alkyl borate removing said alkyl borate by distillation, and reusing the dealkylated reaction mixture by realkylating with more alkylene.

7. A process which comprises dealkylating an alkyl phosphate with boric acid producing an alkyl borate removing said alkyl borate by distillation, and reusing the dealkylated reaction mixture by realkylating with more alkylene.

8. A process which comprises dealkylating an alkyl aryl sulphonate with boric acid producing an alkyl borate removing said alkyl borate by distillation, and reusing the dealkylated reaction mixture by realkylating with more alkylene.

9. A continuous process for producing ethyl alcohol from ethylene comprising the passing of a continuous stream of ethylene and boric acid into sulphuric acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

10. A continuous process for producing ethyl alcohol from ethylene comprising the passing of a continuous stream of ethylene and boric acid into hot sulphuric acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

11. A continuous process for producing ethyl alcohol from ethylene comprising the passing of a continuous stream of ethylene and boric acid into substantially 100% sulphuric acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

12. A continuous process for producing ethyl alcohol from ethylene comprising the passing of a continuous stream of ethylene and boric acid into phosphoric acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

13. A continuous process for producing ethyl alcohol from ethylene comprising the passing of a continuous stream of ethylene and boric acid into hot phosphoric acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously returning the reformed boric acid to the ethylene absorption reactor.

14. A continuous process for producing ethyl alcohol from ethylene comprising the passing of a continuous stream of ethylene and boric acid into substantially 100% phosphoric acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

15. A continuous process for producing ethyl alcohol from ethylene comprising the passing of a continuous stream of ethylene and boric acid into an aryl sulphonic acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

16. A continuous process for producing ethyl alcohol from ethylene comprising the passing of a continuous stream of ethylene and boric acid into a hot aryl sulphonic acid and volatilizing the ethyl borate formed with the excess ethylene, condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

17. A continuous process for producing ethyl alcohol from ethylene comprising the passing of a continuous stream of ethylene and boric acid into a substantially anhydrous aryl sulphonic acid and volatilizing the ethyl borate formed with the excess ethylene condensing the borate ester, but recycling the excess ethylene into the acid, the condensed borate ester being continuously reacted with the stoichiometric proportion of water thereby reforming the boric acid, and continuously distilling off the ethyl alcohol produced, while at the same time continuously returning the reformed boric acid to the ethylene absorption reactor.

18. A process for converting compounds with an olefinic bond to the corresponding alcohols comprising reacting said olefines with an acid of the group consisting of sulphuric, phosphoric, and aryl sulphonic thereby forming an ester depending on the olefine used, and then allowing said ester to react with boric acid thereby forming the corresponding borate ester and regenerating the corresponding acid, said borate ester being then reacted with water to form boric acid and the corresponding alcohol.

19. A process for converting compounds with an olefinic bond to the corresponding alcohols comprising reacting said olefines with sulphuric acid thereby forming an ester of sulphuric acid, and then allowing said sulphate ester to react with boric acid thereby forming the corresponding borate ester, and regenerating the sulphuric acid, said borate ester being then reacted with water to form boric acid and the corresponding alcohol.

20. A process for converting compounds with an olefinic bond to the corresponding alcohols comprising reacting said olefines with phosphoric acid thereby forming an ester of phosphoric acid, and then allowing said phosphate ester to react with boric acid thereby forming the corresponding borate ester, and regenerating the phosphoric acid, said borate ester being then reacted with water to form boric acid and the corresponding alcohol.

21. A process for converting compounds with an olefinic bond to the corresponding alcohols comprising reacting said olefines with an aryl sulphonic acid thereby forming an ester of the corresponding aryl sulphonic acid, and then allowing said sulphonate ester to react with boric acid thereby forming the corresponding borate ester, and regenerating the sulphonic acid, said borate ester being then reacted with water to form boric acid and the corresponding alcohol.

22. A process for producing substantially anhydrous ethyl alcohol comprising the conversion of ethylene to an ethyl ester of an acid of the group consisting of sulphuric, phosphoric, and aryl sulphonic, dealkylating said ester by means of boric acid, thereby producing ethyl borate, distilling off the ethyl borate, and hydrolyzing said ethyl borate producing substantially anhydrous ethyl alcohol and regenerating the boric acid.

23. A process for producing substantially anhydrous ethyl alcohol comprising the conversion of ethylene to an ethyl ester of sulphuric acid, dealkylating said ester by means of boric acid, thereby producing ethyl borate, distilling off the ethyl borate and hydrolyzing said ethyl borate producing substantially anhydrous ethyl alcohol and regenerating the boric acid.

24. A process for producing substantially anhydrous ethyl alcohol comprising the conversion of ethylene to an ethyl ester of phosphoric acid, dealkylating said ester by means of boric acid thereby producing ethyl borate, distilling off the ethyl borate and hydrolyzing said ethyl borate producing substantially anhydrous ethyl alcohol and regenerating the boric acid.

25. A process for producing substantially anhydrous ethyl alcohol comprising the conversion of ethylene to an ethyl ester of an aryl sulphonic acid, dealkylating said ester by means of boric acid, thereby producing ethyl borate, distilling off the ethyl borate, and hydrolyzing said ethyl borate producing substantially anhydrous ethyl alcohol and regenerating the boric acid.

JOSEPH STANLEY.